UNITED STATES PATENT OFFICE.

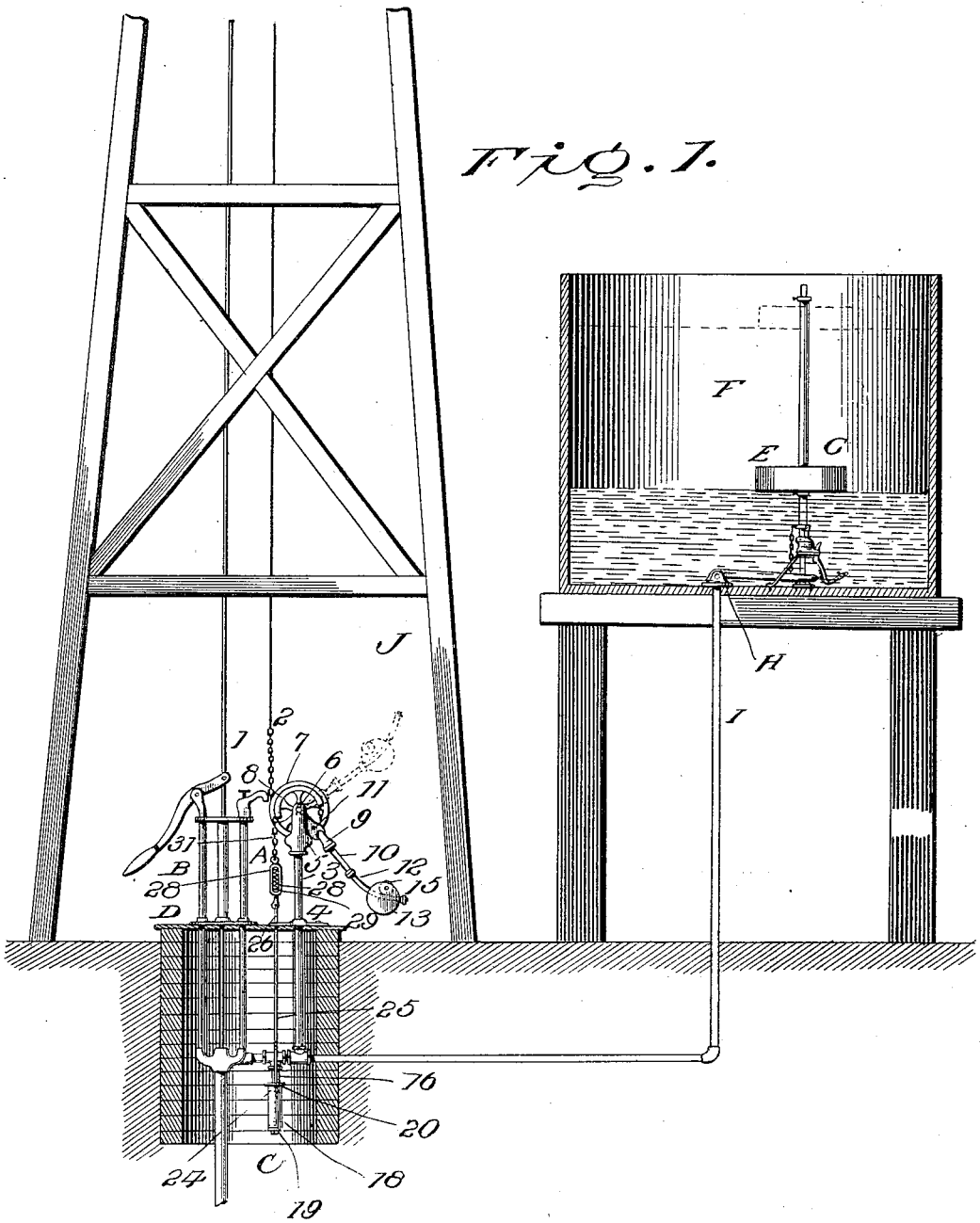

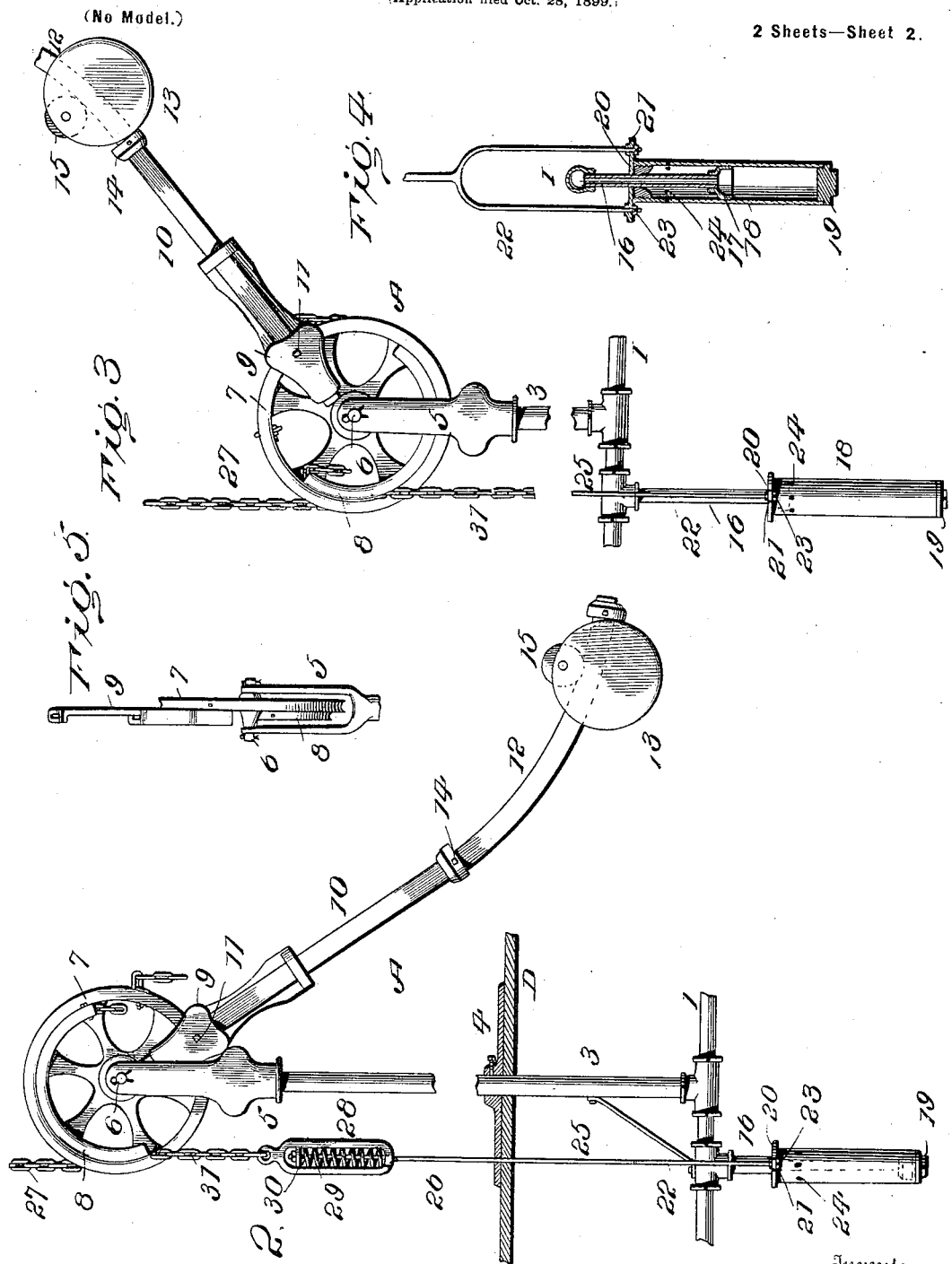

ALBERT T. SCOTT, OF DEFIANCE, IOWA.

WINDMILL-REGULATOR.

SPECIFICATION forming part of Letters Patent No. 658,682, dated September 25, 1900.

Application filed October 28, 1899. Serial No. 735,116. (No model.)

*To all whom it may concern:*

Be it known that I, ALBERT TITIAN SCOTT, a citizen of the United States, residing at Defiance, in the county of Shelby and State of Iowa, have invented certain new and useful Improvements in Windmill-Regulators; and I do hereby declare the following to be a full, clear, and exact description of the invention, such as will enable others skilled in the art to which it appertains to make and use the same.

The present invention deals with the regulator mechanism of windmill-controlling appliances, embodying in their organization a governor actuated by the change of level of the water in the tank and a regulator for throwing the wind-engine out of gear and operated by the pressure of water in the discharge-pipe when the supply to the tank is shut off by the governor.

The regulator is constructed to be applied to windmills of any type, whether forcibly thrown into or out of action by a downpull upon the operating cord or connection. The load and the weight of connections are counterbalanced by a weighted lever, the weight being movable upon the lever to compensate for the varying effective leverage due to the relative change of position of the outer end of the lever, which travels in a circular path.

For a full description of the invention and the merits thereof and also to acquire a knowledge of the details of construction of the means for effecting the result reference is to be had to the following description and the drawings hereto attached.

While the essential and characteristic features of the invention are necessarily susceptible of modification, still the preferred embodiment of the invention is illustrated in the accompanying drawings, in which—

Figure 1 is a detail view showing the regulator operatively related with reference to the pump, governor mechanism, well, and windmill-derrick. Fig. 2 is a detail view of the regulator, showing the relation of the parts when the windmill is in gear. Fig. 3 is a view of the parts shown in Fig. 2, illustrating the relation of the parts when the windmill is out of gear. Fig. 4 is a section of the cylinder and the piston coöperating therewith. Fig. 5 is a detail view of the counterbalancing-wheel and its mountings.

Corresponding and like parts are referred to in the following description and indicated in all the views of the drawings by the same reference characters.

The regulator A and the pump B are located in the well C, and the latter is closed at its upper end by the platform D, resting upon the curb and supporting the various pipes leading from the pump and regulator. The governor mechanism E is arranged in the tank F, conveniently located, and embodies a float G and a valve H, the latter serving to close the delivery end of the supply-pipe I in communication with the pump B and delivering the water therefrom into the tank F. Through intermediate connections the valve H is closed when the float G reaches a predetermined level and opens when said float descends to a given point. So far as the present invention is concerned any governor mechanism that will control the supply of water to the tank and actuated by the change of the level of the water therein may be employed, that illustrated and forming the subject-matter of application filed May 20, 1899, Serial No. 717,631, being preferable. The derrick or tower J of the wind-engine (not shown) is located directly over the well C, and the pump-rod 1 and operating cord or connection 2 are located about centrally thereof. The pump B may be of any type and is connected with the tank by the discharge-pipe I. A standard 3 is connected at its lower end with the discharge-pipe I and is secured to a plate 4, applied to the platform D. A bifurcated head 5 is applied to the upper end of the standard 3 and the upper ends of the bifurcations are transversely apertured to receive a pin 6, upon which a peripherally-grooved wheel 7 is rotatably mounted, said wheel having a grooved segment-flange 8 and a radial arm 9 formed with or applied to a side thereof. The radial arm is formed at its inner and outer ends with side extensions having radial openings to receive the inner end of a lever 10, held in an adjusted position by means of a clamp-screw 11, applied to one of the side extensions of the arm 9. The outer end portion 12 of the lever 10 is curved and receives a movable weight 13, which has a limited play between stops 14 adjustable upon the curved portion 12 of the lever. In order to reduce the friction between the curved portion 12 of the lever and a weight 13 to a minimum amount, a roller 15 is applied to the upper portion of said weight and is adapted to travel upon the upper surface of the curved part 12. The purpose of the weight 13 is to counterbalance the connections between the regulator and the windmill, whereby the pressure of water in the discharge-pipe I will cause a responsive action of the regulator the instant the supply of water to the tank is cut off.

A vertical pipe 16 is pendent from the discharge-pipe I and is in communication therewith and is provided in its lower end with a piston 17, said pipe 16 constituting a tubular piston-rod, through which water from the pipe I finds its way into the cylinder 18, constituting a vital feature of the regulator. The piston and piston-rod are relatively fixed and immovable, whereas the cylinder 18 is slidably mounted with reference thereto and is closed at its lower end by a plug or solid head 19 and at its upper end by a cap 20, centrally apertured for the passage of the pipe or tubular piston-rod 16. Ears 21 are provided at diametrically-opposite points of the cap 20 and are apertured to receive the lower ends of the side rods of a yoke 22, the lower ends of said rods being threaded and receiving pairs of nuts 23, between which the ears 21 are clamped.

Minute vent-openings 24 are provided in the sides of the cylinder 18 at a point below the piston 17 when the cylinder is at its lowest position, so as to provide an escape for water should the pump make a stroke after the cylinder has been forced to its lowest position, thereby obviating straining of the parts. A rod 25 connects the upper end of the yoke 22 with a spring-actuated stem 26, forming part of a yielding connection or safety device in the length of the connection between the yoke 22 and the wheel 7.

The lower end of the operating-cord, rod, or analogous connection 2 is secured to the wheel 7 in such a manner as to effect an unshipping or throwing of the wind-engine out of gear when a sufficient quantity of water has been pumped into the tank F. The manner of connecting the part 2 with the wheel 7 will depend upon the type of wind-engine and the character of shipping mechanism applied thereto. As shown, the part is connected to the wheel 7 in such a manner as to throw the engine out of gear by a positive downpull upon the operating-cord. A chain 27 is secured at one end to a portion of the grooved rim of the wheel 7 and passes thereunder and up over one side and is secured at its upper end to the lower terminal of the part 2, whereby a rotation of the wheel 7 will effect a downpull upon the said chain and throw the wind-engine out of gear in the manner well understood. A rotation of the wheel 7 to the left causes the weighted end of the lever 10 to rise from the position shown in Fig. 2 to the position shown in Fig. 3.

A spring-connection safety attachment is interposed in the length of the connections between the wheel 7 and the regulator and said wheel and the shipping mechanism of the wind-engine. This device consists of a frame 28, having an opening in one end through which the stem 26 is free to move, and a spiral spring 29, encircling the inner portion of the stem 26 and confined between a stop 30 thereof and the end of the frame through which said stem slides. Any sudden movement of the parts is compensated for by a compression of the spring 29, which latter upon expanding gradually transmits the force to the part to be moved, as will be readily comprehended. A chain or like flexible connection 31 is interposed between the grooved float 8 of the wheel 7 and the upper portion of the rod 25 and is secured at one end to the flange 8 and passes thereover in an opposite direction to the connection 27, whereby said parts 2 and 25 move simultaneously in opposite directions.

The regulator when properly installed and connected to the pump and supply-pipe of the tank normally has the cylinder elevated with reference to the piston, the latter occupying the lower end of the cylinder. When the level of the water in the tank reaches the required level, the governor mechanism is actuated and shuts off further supply of water thereto, and the pump continuing to operate increases the pressure in the discharge-pipe, and its excess of pressure is expended in forcing the cylinder downward and throwing the wind-engine out of gear, whereby the action of the pump is discontinued, and this regulator serves to hold the wind-engine unshipped until the delivery end of the pipe I is opened, when the water confined in the cylinder 18 finds a relief, and said cylinder, through the action of the weighted lever, is returned to a normal position and the wind-engine thrown into gear. The air confined in the upper portion of the cylinder escapes through the vent-openings 24 as the cylinder moves downward, and said vent-openings admit air into the upper portion of the cylinder when the latter returns to a normal position, and, as previously stated, said vent-openings provide an exit for excessive pressure when the pump makes a final stroke after the cylinder reaches its downward movement. A slight upward movement of the cylinder causes the piston to close the openings 24, and the water confined in said cylinder holds the wind-engine out of gear until the discharge-pipe I is opened to permit a replenishing of the tank after the level of the water therein has fallen to the lowest point.

By having the weight 13 movable upon the outer end of the lever 10 provision is had for compensating for the variation of the effective leverage due to the travel of the outer end of said lever in an outward path. The upward curvature of the outer portion of the lever materially assists in retarding the too-rapid outward movement of the weight 13 upon the descent of the outer end of the lever and the weight applied thereto. The curved feature of the lever and the movable character of the weight 13 combine to produce a nearly-uniform force upon the outer end of the lever for returning the cylinder 18 and the parts connected therewith to a normal position when the delivery end of the discharge-pipe I is uncovered, whereby the regulator is reset for a repetition of the operation herein described upon closing the pipe 9 and shutting off further supply of water to the tank by the action of the float therein.

The standard 3 is preferably a length of pipe and is connected with the discharge-pipe I by a T-coupling and is in communication therewith and provides an air-chamber to materially reduce pulsations under heavy pressure. This pipe may be of any capacity, according to the required size of air-chamber, and is closed at its upper end by the head 5.

Having thus described the invention, what is claimed as new is—

1. In mechanism for throwing windmills out of gear, a piston and cylinder coöperatively related and interposed in the length of the pipe connecting the pump with the tank and constituting the regulator, means connecting the movable part of the regulator with the releasing connection, whereby the windmill is thrown out of action, a lever conjunctively related with reference to the regulator and windmill-releasing mechanism and having a curved portion, and a counterbalancing-weight mounted upon the curved portion of the lever, substantially as set forth.

2. In mechanism for throwing windmills out of gear, a piston and cylinder coöperatively related and interposed in the length of the pipe connecting the pump with the tank and constituting the regulator, means connecting the movable part of the regulator with the releasing connection, whereby the windmill is thrown out of action, a wheel provided with a lateral offstanding flange and a radial arm, the wheel and flange being connected with, respectively, the windmill-releasing connection and the movable part of the regulator, a lever attached to the radial arm and having a curved portion, a weight slidably mounted upon the curved part of the lever, and stops adjustably secured to the curved part of the lever to limit the travel of the slidable weight, substantially as specified.

3. In mechanism for throwing windmills out of gear, a piston and cylinder coöperatively related and interposed in the length of the pipe connecting the pump with the tank and constituting the regulator, means connecting the movable part of the regulator with the releasing connection, whereby the windmill is thrown out of action, a bifurcated head, a wheel journaled between the bifurcations of said head and provided with a lateral offstanding flange and radial arm, the latter having lateral extensions radially apertured, said wheel and flange being connected, respectively, with the windmill-releasing connection and the movable part of the regulator, a lever having adjustable connection with the lateral extensions of the aforementioned arm and provided with an outer curved portion, stops having adjustable connection with the curved part of the lever, and a weight slidably mounted upon the curved portion of the said lever and limited in its movement by the stops applied thereto, substantially as set forth.

4. In mechanism for throwing windmills out of action, and in combination with the discharge-pipe connecting the pump with the tank, a pipe pendent from the discharge-pipe and having a piston at its lower end, a cylinder closed at its ends and movable upon the piston and pendent pipe and having vent-openings at its upper end, a standard rising from the discharge-pipe, a head fitted to and closing the upper end of the standard, a wheel journaled to the said head and having connection with the said cylinder and cord or like part of the windmill for throwing it out of action, a lever applied to the said wheel and having a curved portion, and a counterbalancing-weight slidably mounted upon the curved part of the lever, substantially as described.

In testimony whereof I affix my signature in presence of two witnesses.

ALBERT T. SCOTT. [L. S.]

Witnesses:
M. PENNISTON,
ED PENNISTON.